United States Patent Office 3,524,631
Patented Aug. 18, 1970

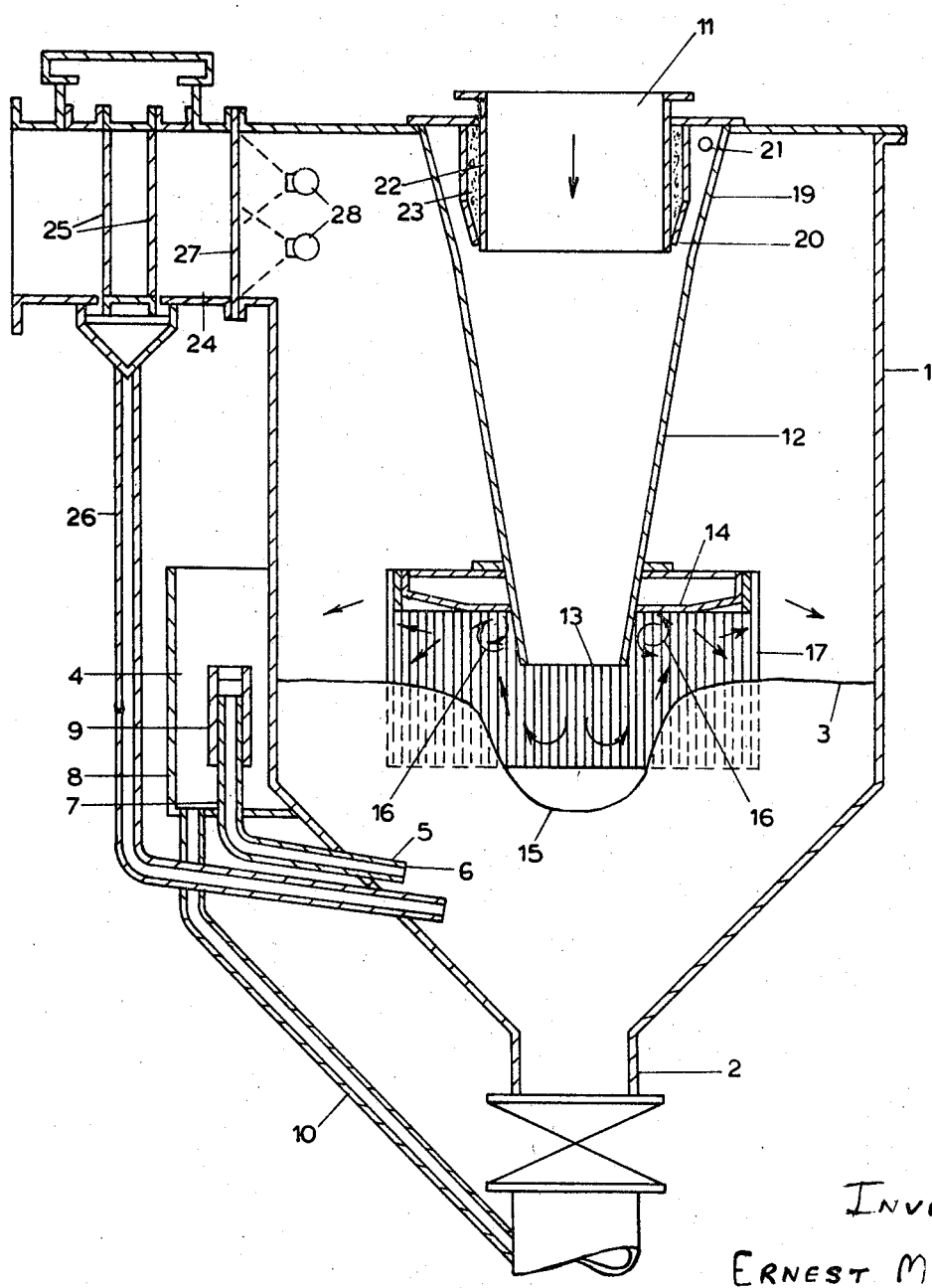

3,524,631
MEANS FOR CARRYING OUT GAS SCRUBBING OPERATIONS
Ernest Mare, Johannesburg, Transvaal, Republic of South Africa, assignor of ten percent to John Pirie Brander Stuart, Johannesburg, Transvaal, Republic of South Africa
Filed Nov. 6, 1967, Ser. No. 680,887
Claims priority, application Republic of South Africa, Nov. 22, 1966, 66/7,061
Int. Cl. B01d 47/02
U.S. Cl. 261—112                              11 Claims

ABSTRACT OF THE DISCLOSURE

Method and apparatus for carrying out gas scrubbing, heat exchange, evaporation and condensation operations and operating on the principle of discharging gas onto a liquid surface. The gas is discharged from an outlet spaced downwardly below a horizontally extending shield under conditions which will ensure a resultant upward flow of liquid entrained in gas which will shatter against the undersurface of the shield.

---

This invention relates to gas scrubbing operations and to gas scrubbers for removal of solid particles or other constituents, whether liquid or gaseous, entrained or contained in a gas stream, and may also be used for heat exchange, evaporation and condensation operations.

Applicant has previously developed a gas scrubber comprising a liquid reservoir, a gas inlet pipe in the reservoir, the outlet end of said pipe terminating at its bottom peripheral edge in a generally horizontally extending shield and said gas inlet pipe positioned to discharge downwardly below the shield. A skirt depended from the shield and embodied a plurality of discharge outlets each of considerably smaller cross-sectional area than the minimum area of the bore of the inlet pipe. Means were also provided for maintaining a liquid level in the reservoir between the bottom of the shield and the bottom of the skirt.

While this type of scrubber was efficient under carefully controlled pilot plant conditions, the efficiency thereof in commercial operation proved lower except in very few cases. This has been found to be due to surging of the water or scrubbing liquid under the shield resulting in very variable scrubbing efficiencies. This occurs particularly at high gas velocities for example of the order of 10,000 to 15,000 feet per minute nozzle velocities at the outlet end of the inlet pipe.

The impact of the gas discharged from the gas inlet pipe causes a concavity on the water surface below said pipe, and the water entrained in the gas stream flows from this concavity in an upwardly and outwardly inclined direction. It is necessary that for efficient scrubbing this upwardly inclined flow of water should be largely in uniformly directed streams which shatter against the under surface of the shield. It is not possible to attain such conditions when surging occurs but on the other hand provided largely laminar flow can be achieved then operating parameters can be suitably adjusted to achieve uniformly good results.

It is accordingly an object of this invention to provide means which will prevent such surging whereby more uniform efficiencies may be obtained under varying conditions, all of which efficiencies are high in relation to the prime and operating costs of the scrubber.

In accordance with this invention there is provided a method of gas scrubbing comprising:

(a) maintaining a body of liquid at approximately constant level in a reservoir, (b) discharging the gas to be scrubbed through a downwardly directed pipe onto the surface of the liquid and at sufficiently high minimum velocity to form a substantial concavity in the surface of the liquid, (c) locating a generally horizontally extending shield around the gas inlet pipe and spaced upwardly from the outlet end of said pipe, and (d) maintaining the liquid in the reservoir at a level, in relation to the shield diameter and gas velocity, which will ensure that the resultant upward flow of liquid entrained in gas will shatter against the undersurface of the shield.

According to further features of the invention the gas to be scrubbed is discharged through an inlet pipe having a downwardly tapered outlet end, and the liquid after shattering against the undersurface of the shield, and entrained in the gas stream, is constrained to pass through a screen.

A scrubber suitable for carrying out this invention is illustrated in sectional side elevation in the accompanying drawings.

As shown in the drawings there is provided a water reservoir in the form of a tank 1 containing water and having a downwardly coned bottom discharge outlet 2 controlled by a valve or other means. The level 3 of the water in tank 1 is maintained at a predetermined level by any conventional means which may include a ball cock, a weir type overflow and the adjustable water sealed overflow outlet 4 illustrated. The latter consists of a pipe 5 with the lower end 6 extending into the tank below the water level and the upper end 7 accommodated in a box 8. The upper end of the pipe may be fitted with a flexible tube or telescoping sleeve 9 whereby the water level in the tank 1 is adjusted. The water flowing into the box 8 from the upper end of sleeve 9 may be conveyed to the outlet pipe 2 by the drain pipe 10.

Located centrally in the tank 1 is a vertical gas inlet pipe comprising an upper portion 11 and a lower portion 12 which is downwardly tapered throughout its length.

Extending around the portion 12 of pipe 11 and spaced a substantial distance above the bottom or outlet end 13 is a generally horizontally extending annular shield 14.

Attached to the periphery of the shield 14 and extending downwardly below the level of the water is a cylindrical screen 17 which may be in the form of a wire mesh, parallel spaced strips or bars, perforated plate or the like.

In use, the gas to be scrubbed is discharged under positive or negative pressure through the inlet pipe 11, 12 and onto the surface of the water and at sufficiently high velocity so that the impact of the gas causes a concavity 15 of substantial depth in the water surface. After impingement the water entrained in the gas as droplets flows upwardly and part forms an eddy stream 16 of toroidal shape around the portion of the inlet pipe projecting below the shield.

In general, the main gas and liquid droplet flow is laminar and upwardly and outwardly inclined from the concavity 15, the droplets being atomised or reduced in size partly by contact with the eddy stream 16 and partly by the droplets shattering against the undersurface of the shield. The mixture of liquid and gas then flows through the annular screen 17 attached to the periphery of shield 14 and extending downwardly therefrom below the level 3 of the water.

The scrubbing action which occurs is due to a number of factors and certain operational parameters are very important to achieve efficient scrubbing and prevention of surging at varying gas velocities.

Thus the lower portion 12 of the inlet pipe should preferably be of downwardly reducing diameter as shown but whether or not this is the case the inlet pipe should project below the shield a distance approximately equal to ¼ to ¾ D and preferably ½ D where D is the diameter of the discharge end of the inlet pipe.

Essentially surging should be avoided and even the extension of the lower portion 12 of the gas inlet pipe below the level of the shield 14 will not prevent this at high gas velocities if the water level 3 is too high. A further essential is that the upward flow of water should shatter against the undersurface of the shield and providing this condition is achieved the eddy stream 16 will automatically form. Generally increase in nozzle velocity of gas from pipe 12, lowering of water level and decrease in the angle of taper of the lower end 12 of the inlet pipe will all tend to increase the outward angle of the upward flow of water from the concavtiy 15. If said outward angle of flow of the water to the vertical is too great in relation to the shield diameter the water may flow mainly past the outer edge of the shield 14 and thus fail to shatter against the undersurface thereof.

While the shield diameter may be increased to prevent this, in practice it has been found for most satisfactory results the shield diameter should be related to the diameter D of the discharge end 13 of the inlet pipe 12 and should be approximately 3.5D.

The liquid level may be varied within limits and at high discharge velocities of upwards of 10,000 feet per minute may be maintained at a distance below the discharge end of pipe 12 of ½ D or at a lesser distance providing substantial surging does not occur.

Since, in relation to an inlet pipe 12 of any specific outlet diameter, increase in the angle of taper of the pipe 12 has the opposite effect to increase in gas discharge velocity on the outward angle of discharge of the water from concavity 15, the angle of taper is increased with increase in gas velocity. As a typical example the angles of taper may be 15° and 18° respectively with nozzle velocities from pipe 12 of 10,000 and 15,000 feet per minute respectively.

Preferably the outer portion of the shield 14 is upwardly inclined at an angle of 6° to 12° or alternatively the shield is dished.

The screen is preferably in the form of parallel bars but may be of any other suitable type and in any case the total area of the interstices through the screen is appreciably greater than the area of the outlet end of pipe 12.

The screen is necessary for maximum scrubbing efficiency but in cases where it is liable to become clogged it may either be eliminated entirely or be fitted to project in an outward or horizontal direction not shown so that material held by the screen 17 will tend to fall downwardly into the reservoir. It will be seen that where an outwardly directed screen is used it extends from the periphery of the shield to the internal wall of the tank 9 so that water entrained in the gas stream and flowing from under the shield is constrained to pass through the screen.

The make-up water may be fed directly into the reservoir or be fed onto the shield. The inlet flow of the make-up water can, however, also be used to perform a scrubbing action by discharging it around the inside of pipe 12. In this case, the make-up water is fed into a water feed jacket 19 formed integrally as the upper portion of inlet pipe 12 and surrounding the gas inlet pipe 11. An annular opening or passage 20 is formed between water jacket 19 and gas inlet pipe 11 above the shield 14 through which the make-up water is discharged into the bore of the lower portion 12 of the inlet pipe 11. The make-up water is introduced into the jacket 19 in a tangential direction through outlet 21 and where hot gases are being scrubbed an annular chamber 22 filled with heat insulating material 23 may be interposed between the water feed jacket and gas inlet pipe.

The scrubbed gas is discharged through an outlet 24 which may incorporate a moisture eliminator 25 with a return water feed 26 to tank 1. The outlet 24 may also incorporate a secondary scrubber of the parallel bar type for example, and comprising a screen 27 located on the up-stream side of the eliminator 25, and extending across the full cross section of outlet 24. High velocity water jets 28 are directed onto the screen 27 in a direction concurrent with the gas flow through said screen.

What I claim as new and desire to secure by Letters Patent is:

1. A method of gas scrubbing comprising:
   (a) maintaining a body of liquid at approximately constant level in a reservoir;
   (b) flowing the gas to be scrubbed through a downwardly directed pipe having a tapered outlet end extending through and below a horizontal shield while constraining the gas to pass through a flow section of gradually diminishing cross-section extending from substantially one end of the pipe to the other and discharging the gas onto the surface of the liquid and at a predetermined high minimum velocity, the gas forming a substantial stable concavity in the surface of the liquid,
   (c) maintaining a relationship between the shield diameter, the gas velocity and the distance of the liquid level in the reservoir from the outlet end of the downwardly directed pipe to ensure that the resultant upward flow of liquid entrained in the gas maintains a substantially laminar flow and shatters against the undersurface of the shield,
   (d) forming an eddy stream of toroidal shape, of said gas entrained liquid, around the portion of the inlet pipe projecting below the shield upon shattering thereagainst, and
   (e) constraining the gas and liquid to pass from the undersurface of the shield through an annular screen connected to and extending downwardly from the periphery of the shield.

2. A method as claimed in claim 1 in which make up liquid is introduced into the reservoir by being discharged down the internal walls of the said downwardly directed pipe.

3. A method as claimed in claim 1 in which the liquid level in the reservoir is maintained a distance below the outlet end of the downwardly directed pipe equal to less than half the diameter of said outlet end.

4. A method as in claim 1 wherein said gas is caused to flow through said pipe under positive pressure.

5. A gas scrubber comprising a liquid reservoir; a downwardly directed and downwardly tapered gas inlet pipe in the reservoir; an annular generally horizontally extending shield extending around the pipe and located a substantial distance above the bottom outlet end of said pipe; means maintaining a liquid level in the reservoir below and closely adjacent the outlet end of said pipe; a screen attached to the periphery of the shield and extending downwardly therefrom below the liquid level in the reservoir and the outlet end of the said pipe; said downwardly tapered pipe, said shield and said liquid level cooperating to produce substantially laminar flow of gas entrained liquid for a given gas velocity and further causing an eddy stream of toroidal shape of gas entrained liquid to form around the portion of the inlet pipe projecting below the shield.

6. A gas scrubber as claimed in claim 5 including a water fed jacket fitted around the gas inlet pipe, an annular passage in the latter communicating with the water feed jacket and a tangentially directed water inlet connected to said jacket.

7. A scrubber as claimed in claim 5 including a gas outlet from the reservoir, a moisture eliminator incorporated in said gas outlet, a screen extending across the full cross section of the outlet and located on the upstream side of the eliminator and high pressure water jets directed onto the upstream side of the screen.

8. A gas scrubber as in claim 5 wherein the inlet pipe projects below the shield a distance falling within the range of one-fourth to three-fourths the diameter of the discharge end of the pipe.

9. A gas scrubber as in claim 8 wherein the diameter of the shield is approximately three and one-half times the diameter of the discharge end of the pipe.

10. A gas scrubber as in claim 9 wherein the liquid level is spaced from the discharge end of the pipe a distance approximately one-half the diameter of the discharge end of the pipe.

11. A method of gas scrubbing comprising:
(a) maintaining a body of liquid at a substantially constant level in a liquid reservoir;
(b) flowing a stream of gas through a downwardly converging pipe downwardly into said reservoir onto the surface of the liquid contained therein, said converging pipe constraining said gas to pass through a flow section of gradually reducing cross-section;
(c) discharging said gas from the converging pipe onto the surface of the liquid with sufficient velocity to produce a substantial concavity in the surface of the liquid, said gas entraining part of said liquid as it strikes the surface thereof;
(d) causing substantially all of the gas and entrained liquid to be deflected upwardly and outwardly from the surface of the liquid directly against a horizontal shield disposed adjacent to but spaced from the end of said pipe;
(e) causing said gas and entrained liquid, as it strikes the shield, to form a toroidal shaped eddy stream around the end of the pipe below the shield;
(f) causing substantially all of said gas and entrained liquid to contact said eddy current and said shield as it is deflected from the surface of the liquid to atomize the droplets of entrained liquid;
(g) causing said concavity and said flow of gas and entrained liquid to assume substantially steady state conditions to prevent surging of said liquid and consequent inefficient scrubbing action; and
(h) constraining the gas and entrained liquid to pass from the undersurface of said shield through a screen located below the shield in the reservoir.

References Cited

UNITED STATES PATENTS

| | | | |
|---|---|---|---|
| 1,994,766 | 3/1935 | Heglar | 55—246 X |
| 2,004,467 | 6/1935 | Hawley | 55—95 X |
| 2,242,460 | 5/1941 | Enblom. | |
| 2,509,817 | 5/1950 | Foreman | 55—236 |
| 2,000,706 | 5/1935 | Lowther | 55—251 X |
| 2,187,573 | 1/1940 | McCormack | 55—229 X |
| 2,646,263 | 7/1953 | Goldberg | 55—220 |
| 3,142,548 | 1/1964 | Krantz | 55—233 X |
| 3,386,229 | 6/1968 | Reed | 55—242 X |

FOREIGN PATENTS 240,974   10/1925   Great Britain.

FRANK W. LUTTER, Primary Examiner

S. H. MARKOWITZ, Assistant Examiner

U.S. Cl. X.R.

55—223, 241, 255, 257; 261—116, 119